US012746684B2

(12) United States Patent
Tudor et al.

(10) Patent No.: US 12,746,684 B2
(45) Date of Patent: Sep. 29, 2026

(54) METHOD AND DEVICE FOR REMOVING A PRODUCT FROM A STACK

(71) Applicant: TGW Logistics GmbH, Marchtrenk (AT)

(72) Inventors: Carmen Tudor, Wels (AT); Dominique Wyss, Zürich (CH)

(73) Assignee: TGW Logistics GmbH, Marchtrenk (AT)

( * ) Notice: Subject to any disclaimer, the term of this patent is extended or adjusted under 35 U.S.C. 154(b) by 224 days.

(21) Appl. No.: 18/708,673

(22) PCT Filed: Nov. 8, 2022

(86) PCT No.: PCT/AT2022/060385

§ 371 (c)(1),
(2) Date: May 9, 2024

(87) PCT Pub. No.: WO2023/081945

PCT Pub. Date: May 19, 2023

(65) Prior Publication Data

US 2025/0010479 A1 Jan. 9, 2025

(30) Foreign Application Priority Data

Nov. 9, 2021 (AT) .............................. A 50888/2021

(51) Int. Cl.
*B25J 9/16* (2006.01)
*B65G 59/02* (2006.01)
(Continued)

(52) U.S. Cl.
CPC ............ *B25J 9/1697* (2013.01); *B65G 59/02* (2013.01); *G06T 7/13* (2017.01); *G06T 7/73* (2017.01);
(Continued)

(58) Field of Classification Search
CPC .... B25J 9/1697; B25J 9/1687; B25J 15/0014; B65G 59/02; B65G 2203/0216;
(Continued)

(56) References Cited

U.S. PATENT DOCUMENTS 9,452,894 B2 * 9/2016 Puchwein .............. B65G 47/06
10,456,915 B1 * 10/2019 Diankov ................... G06T 7/73
(Continued)

FOREIGN PATENT DOCUMENTS

CN 110490524 A 11/2019
DE 102017002478 A1 9/2018
(Continued)

OTHER PUBLICATIONS

European Patent Office. International Search Report and Written Opinion of the International Searching Authority in Application No. PCT/AT2022/060385, mailed Feb. 24, 2023, 29 pages.

*Primary Examiner* — Michael Collins
(74) *Attorney, Agent, or Firm* — Miller Nash LLP

(57) ABSTRACT

A method for removing a unit load from a stack by means of an automatic transfer device includes capturing an image of the stack by means of an image capturing unit, which image is evaluated by means of an evaluation unit in order to recognize an identification mark arranged on the unit load and identify the unit load. The unit load data assigned to the unit load are read out from a database, from which unit load data an edge position of the unit load can be computed. The transfer device can be controlled on the basis of the edge position in order to remove the unit load. The present disclosure further relates to a transfer station with a transfer device and a computer-implemented method for generating a movement specification for the automatic transfer device.

16 Claims, 10 Drawing Sheets

(51) Int. Cl.

| | |
|---|---|
| ***G06K 7/14*** | (2006.01) |
| ***G06T 7/13*** | (2017.01) |
| ***G06T 7/73*** | (2017.01) |
| ***G06V 20/50*** | (2022.01) |

(52) U.S. Cl.
CPC ...... *G06V 20/50* (2022.01); *B65G 2203/0216* (2013.01); *G06K 7/1413* (2013.01); *G06V 2201/06* (2022.01)

(58) Field of Classification Search
CPC ...... B65G 2203/0233; B65G 2203/041; B65G 61/00; B65G 65/02; G06T 7/13; G06T 7/73; G06V 20/50; G06V 2201/06; G06K 7/1413; G05B 2219/40006; G05B 2219/40538
See application file for complete search history.

(56) References Cited

U.S. PATENT DOCUMENTS

| | | | | |
|---|---|---|---|---|
| 12,427,656 | B2 * | 9/2025 | Prechtl | B25J 9/1612 |
| 2020/0134828 | A1 | 4/2020 | Diankov et al. | |
| 2020/0238519 | A1 * | 7/2020 | Diankov | B25J 9/1697 |
| 2020/0269432 | A1 * | 8/2020 | Beinhofer | B25J 19/023 |
| 2020/0273131 | A1 | 8/2020 | Martin et al. | |
| 2021/0024298 | A1 * | 1/2021 | Doppler | B65G 47/52 |
| 2021/0107750 | A1 | 4/2021 | Iino et al. | |
| 2021/0261337 | A1 | 8/2021 | Schedlbauer et al. | |
| 2023/0348192 | A1 | 11/2023 | Forster | |
| 2023/0415345 | A1 * | 12/2023 | Zizka | B25J 5/007 |
| 2024/0199333 | A1 * | 6/2024 | Zizka | B65G 1/1373 |

FOREIGN PATENT DOCUMENTS

| | | | |
|---|---|---|---|
| EP | 2269925 | A1 | 1/2011 |
| EP | 3886015 | A1 | 9/2021 |
| JP | 2012192490 | A | 10/2012 |
| WO | 2010123458 | A1 | 10/2010 |
| WO | 2020014725 | A2 | 1/2020 |
| WO | 2021142498 | A1 | 7/2021 |

* cited by examiner

METHOD AND DEVICE FOR REMOVING A PRODUCT FROM A STACK

RELATED APPLICATIONS

This is a national stage under 35 U.S.C. § 371 of International Application No. PCT/AT2022/060385, filed Nov. 8, 2022, which claims priority of Austrian Patent Application No. A50888/2021, filed Nov. 9, 2021.

TECHNICAL FIELD

The field of this disclosure relates to a method for removing a unit load from a stack of multiple unit loads arranged on top of one another in a transfer station.

Furthermore, the field of the disclosure relates to a transfer station for removing a unit load from a stack of multiple unit loads arranged on top of one another.

The field of the disclosure further relates to a storage system having such a device.

Finally, the field of the disclosure also relates to a computer-implemented method for generating a movement specification for a gripping unit of an automatic transfer device.

BACKGROUND

Methods and devices for removing a unit load from a stack are known from the prior art.

For example, it is known from DE 10 2017 002 478 A1 that an image of a stack of multiple unit loads is captured and unit load edges are captured by image recognition. Here, it is disadvantageous that a recognition of the unit load edges by image recognition proves difficult and yields reliable results only under perfect conditions.

Further, it is known from EP 2 269 925 A1 that a barcode is arranged on unit loads of a stack, for which a piece of information regarding the height of the respective unit load, for example, is deposited. Here, the barcodes of unit loads of a topmost row of the stack can be read out in order to determine a required lifting height, which enables a transfer of the topmost row of the stack onto an unloading plane. It is disadvantageous here that the absolute position of the unit loads in the stack cannot be determined.

A method for removing a unit load from a stack is also known from CN 110490524 A and EP 3 886 015 A1, respectively, wherein identification marks, for example barcodes, are arranged at the unit load.

A need remains for an improved method and an improved transfer station for removing a unit load from a stack.

SUMMARY

In accordance with the present disclosure, in a method for removing a unit load from a stack of multiple unit loads arranged on top of one another in a transfer station, a unit load of the unit loads is removed from the stack by a gripping unit of an automatic transfer device and is transferred to a transport system for transporting away the unit loads, wherein a plurality of the unit loads each have an identification mark assigned to the respective unit load, wherein each identification mark is arranged at a defined identification position at the respective unit load, and unit load data for each of the unit loads are deposited in a database, wherein the unit load data comprise at least the respective identification position, wherein the identification position is specified relative to at least one unit load edge of the respective unit load, and wherein the method comprises the following steps:

i) provisioning the stack in the transfer station, in particular by a transport system for transporting the stack to the transfer station, ii) capturing an image of a first side of the stack by an, in particular electronic, image capturing device and transmitting the captured image to a, preferably electronic, evaluation unit, iii) evaluating the captured image by the evaluation unit, wherein an identification mark of the identification marks is recognized by image recognition and an absolute position of the identification mark relative to a reference point is determined, iv) identifying a unit load, assigned to the recognized identification mark, reading unit load data of the identified unit load out from the database, v) determining an edge position of the at least one unit load edge relative to the reference point by the evaluation unit, wherein the edge position is computed from the determined absolute position of the identification mark assigned to the identified unit load and from its identification position, vi) transmitting the edge position of the at least one unit load edge of the identified unit load to a control device for controlling the automatic transfer device, vii) controlling the automatic transfer device by the control device, so that the gripping unit of the automatic transfer device is aligned relative to the identified unit load on the basis of the determined edge position, viii) removing the identified unit load from the stack and transferring the identified unit load to the transport system by the automatic transfer device.

Arranging the identification mark at a defined position at the unit loads, namely the identification position, ensures that merely the identification mark must be recognized by image recognition in order to precisely determine the position of the respective unit loads in the stack and/or their unit load edges, which is why the image recognition can be carried out efficiently and with minor computational effort. Furthermore, the reliability of the method is increased, as the recognizability of the individual identification marks does not depend on a distinguishability of unit loads and/or a contrast of edges between two unit loads. This means that the method can be carried out reliably also in poor lighting conditions.

Preferably, the stack of unit loads is provisioned on a transport loading aid or a load carrier, such as, for example, on a pallet or on a roller container. An example of a transport loading aid is described in detail in WO 2020/014725 A2 or WO 2021/142498 A1.

As a rule, the unit load comprises a bottom wall as well as side walls, which extend starting from the bottom wall and bound an interior space. Preferably, the unit load comprises four side walls. The side walls of the unit load can each be bounded by a unit load top edge, a unit load bottom edge and unit load side edges, which extend from the unit load bottom edge to the unit load top edge. Further, the unit load can be configured upwardly open, closed, or closable, for example with a cover.

Advantageously, the at least one unit load edge comprises the unit load bottom edge, the unit load top edge and/or the unit load side edges.

It is favorable if the unit load comprises a stackable article carrier, in which articles are placed. The article carrier can be configured, for example, as a stackable container of plastic or as a cardboard box. Usually, the stack comprises article carriers of the same kind, i.e. either containers or cardboard boxes. However, also a mixed stack is conceivable, wherein a stack comprises both containers and cardboard boxes.

It can be provided that the stack of unit loads, on the one hand, comprises a plurality of identifiable unit loads, which have a (recognizable) identification mark and are therefore identifiable. It is particularly favorable if all unit loads of the stack have a (recognizable) identification mark and are therefore identifiable. However, it may occur that the stack also comprises one or multiple non-identifiable unit loads, which have no identification mark or whose identification mark is not recognizable by the evaluation unit or for which the unit load data are only incompletely deposited in the database. This is the case, for example, if the identification mark is lost, dirty or damaged.

It is favorable if the identification mark comprises a GRAI code ("Global Returnable Asset Identifier" code), which, in addition to an identification number, also comprises a piece of container type information. Here, the unit load data can comprise dimensions of the respective container type.

The identification mark preferably comprises a code that is readable optoelectronically, such as, for example, a barcode or a two-dimensional code, in particular a QR code. Alternatively, the identification marks of the unit loads can also have mutually distinguishable symbols.

Furthermore, it is favorable if the identification mark, in particular at least in a periphery of the identification mark, has a different color than the unit load. Here, the color is preferably selected such that a high contrast between the unit load and the identification mark is provisioned. For example, on a dark, in particular gray, unit load, a white identification mark can be provided. This ensures that the identification mark is easily recognizable by the image recognition.

Preferably, the identification mark is arranged, in each case, at a side wall of the unit loads. To that end, the identification mark can be attached, on the one hand, at the side wall, for example glued to it, inserted in a holder or suchlike. On the other hand, the identification mark can be configured integral with the respective unit load, for example embossed, punched or suchlike in the side wall. Evidently, the stack can comprise exclusively unit loads with attached identification marks. Equally, the stack can comprise exclusively unit loads with integral identification marks. Alternatively, the stack can also comprise unit loads with attached identification marks and unit loads with integral identification marks.

The unit load edges extend preferably from a first end point to a second end point. A plurality of edge points can be located between the first end point and the second end point, which edge points are located on the unit load edge.

Preferably, the identification position comprises one or multiple ID vectors (identification mark vector), each of which extend from a start point to any point on the unit load edge, in particular to the first end point or to an edge point. The start point can be the center of the identification mark or any point on a periphery of the identification mark.

Furthermore, it can be provided that the unit load data comprise a dimension of the respective unit load, in particular a width, height and/or depth. In particular, the dimension can be specified by dimension vectors. These preferably extend for each unit load edge from its first end point to its second end point. What is more, it can be provided that the unit load data contain a piece of content information, which specifies which articles and/or how many articles the unit load contains.

The absolute position is specified relative to a reference point. The reference point can be, for example, a coordinate origin. Preferably, the absolute position is specified as an absolute vector, which extends from the reference point to a point of the identification mark, in particular a point in the periphery of the identification mark or the center of the identification mark. Preferably, this point of the identification mark is selected as start point for the ID vector.

Here, it is particularly advantageous that the unit load and/or the position of the unit load in the stack is describable by the absolute vector, one or multiple ID vectors and one or multiple dimension vectors.

Advantageously, the image capturing device comprises an image capturing unit, for example a camera, which is configured for capturing an image of a side of the stack.

The transfer device comprises a preferably mobile gripping unit, which is configured for gripping the unit loads. The gripping unit can in particular be configured as a suction gripping unit and/or as a clamping gripping unit.

In a preferred embodiment, the gripping unit of the transfer device comprises a base frame and at least one loading tongue that is movable in a first direction (y) relative to the base frame between a retracted initial position and an extended receiving position. Furthermore, the gripping unit can have clamping jaws for clamp-gripping at least one unit load that are movable in a second direction (x) relative to each other between a retracted opening position and an adjusted clamping position. Such a transfer device and gripping unit, as well as a removal operation of a unit load by such a gripping unit, is described, for example, in WO 2020/014725 A2, in particular in relation to FIG. 13*a* to FIG. 13*d*, FIG. 14*a* to FIG. 14*d*, FIG. 15*a* to FIG. 15*n* and FIG. 16*a* to 16*o*.

It is favorable if the identification marks of the unit loads are arranged at a first side wall and/or at a second side wall of the respective unit load, wherein

- in step ii), an image of a second side of the stack is additionally captured by the image capturing device and transmitted to the evaluation unit, and
- step iii) is carried out for the captured image of the first side of the stack and/or for the captured image of the second side of the stack.

To that end, it can be provided that the stack is provisioned on a rotating device in a first position, in which the image of the first side is recorded, and is subsequently rotated by the rotating device, in particular about a vertical axis of rotation, preferably by 90°, so that the image capturing device can capture an image of the second side of the stack. Advantageously, it is provided that the image capturing device has an image capturing unit, for example a camera, which is arranged such that the first side of the stack faces the image capturing unit in the first position and the second side of the stack faces the image capturing unit in the second position.

As will be described later in relation to the transfer device, it can alternatively be provided that the image capturing device comprises a first image capturing unit for capturing an image of the first side of the stack and a second image capturing unit for capturing an image of the second side of the stack.

Preferably, the identification mark of the respective unit load is arranged at a first side wall and/or at a second side wall. It is particularly advantageous if the identification mark comprises a first identification mark, which is arranged at the first side wall, and a second (identical) identification mark, which is arranged at the second side wall. This renders the method more robust, as also a load carrier in which one of the identification marks is covered, for example, can be recognized in the stack. It is favorable here if the first side wall and the second side wall adjoin each other, so that they form a corner of the unit load. To that end, the first side wall and the second side wall can enclose, for example, an angle of 90°.

To recognize multiple unit loads of the stack, it is advantageous if steps iii) to v) are repeated for at least one other identification mark, in particular an identification mark of another unit load.

A repetition of steps iii) to v) for another unit load can be done continuously, in particular before or during steps v) to viii). Here, multiple unit loads can initially be captured and subsequently removed, which enables a quick unloading of a plurality of unit loads.

Equally, a repetition of steps iii) to v) can be done by repeating steps iii) to viii) after concluding step viii). Here, unit loads are captured in succession and immediately removed. This enables in particular a particularly quick access to the first unit load which is to be unloaded.

It is also advantageous if the stack comprises a non-identifiable unit load, wherein the edge position of the at least one unit load edge of the non-identifiable unit load is determined from the edge position of the at least one unit load edge of one or multiple adjacent unit loads. Thus, also the position, in the stack, of a unit load that cannot be identified can be determined.

In particular, a distance between identification marks of two (identifiable) unit loads arranged essentially on top of one another and/or next to one another can be determined. For example, if the distance between the identification marks is greater than would be expected for the respective unit loads on the basis of their respective dimensioning, this may indicate that at least one non-identifiable unit load is located between the identifiable unit loads. Analogous considerations apply to (identifiable) unit loads arranged essentially next to one another. Here, "essentially on top of one another" and/or "essentially next to one another" means that, while the respective unit loads are arranged in a row next to one another or in a column on top of one another, another load carrier can optionally be located between them.

A non-identifiable unit load is, for example,

- a unit load which has no identification mark,
- a unit load whose identification mark is not recognized by the evaluation unit in step iii), for example because the identification mark is faulty or dirty, and/or
- a unit load for which the unit load data are incompletely deposited in the database.

Unit load data are incompletely deposited in the database whenever, for example, the identification position, the dimension of the unit load and/or the piece of content information is not deposited or is faulty.

An adjacent unit load can in particular be a unit load located beside (arranged next to the non-identifiable unit load), a unit load located above (arranged on top of the non-identifiable unit load) or a unit load located below (arranged beneath the non-identifiable unit load). The term "adjacent" can thus comprise, in this context, in particular located beside, located above or located below.

Here,

- the unit load bottom edge of a unit load located above can correspond to the unit load top edge of the non-identifiable unit load,
- the unit load top edge of a unit load located below can correspond to the unit load bottom edge of the non-identifiable unit load, and/or
- the unit load side edge of a unit load located beside can correspond to a unit load side edge of the non-identifiable unit load.

The edge position can then be transmitted to the control device by the evaluation unit.

It also proves favorable if steps vi) to viii) are carried out for the non-identifiable unit load and the at least one non-identifiable unit load is transported to an error handling workstation by the transport system. At the error handling workstation, the kind of unit load and/or the piece of content information can be determined, for example. Here, it can be provided, for example, that a content of a container or of a cardboard box is identified by a person. Alternatively, instead of the person, a means for automated identification of a content can be provided, which recognizes the content, for example by image recognition. It can further be provided that a new identification mark is affixed to the unit load at the error handling workstation.

In accordance with an advancement, steps iii) to v) are repeated for all recognizable identification marks, wherein, in step v), a digital image of the stack is generated on the basis of the determined edge positions of the respective unit loads. On the basis of the digital image, the control device can be controlled particularly efficiently.

Preferably, it is provided here that the unit load data additionally comprise a unit load dimension, wherein the digital image of the stack is generated on the basis of the determined edge positions and on the basis of the unit load dimension of the respective unit loads. To that end, the unit load dimension can comprise a length, width and/or height of the respective unit load.

Preferably, also the non-identifiable unit load or the non-identifiable unit loads are mapped in the digital image of the stack if there are one or multiple non-identifiable unit loads. To that end, the unit load edges of the non-identifiable unit load are determined from the unit load edges of the respectively adjacent unit loads, as described above.

To control the automatic transfer device particularly efficiently, it is favorable if the transmitting of the edge position of the unit load edges of the identified unit loads is done in step vi) by transmitting the digital image of the stack to the control device. This enables an entire unstacking operation, in which all unit loads of the stack are transferred to the transport system, to be planned ahead and/or implemented efficiently.

It is particularly favorable if steps vi) to viii) are repeated for at least one other unit load, in particular until a defined number of unit loads of the stack has been transferred to the transport system.

The defined number of unit loads can result, for example, from a picking order, which specifies how many unit loads are required from the stack.

In a preferred embodiment of the method, it is provided that the steps iv) to vi) are repeated until such time as all unit loads have been transferred from the stack to the transport system. This is advantageous in particular at a goods receipt if the stack is to be broken up for storing the unit loads.

Making use of the effects and advantages described above, an embodiment comprises a transfer station including a transport system for transporting away unit loads, an automatic transfer device, which has a gripping unit for gripping unit loads, wherein the transfer device is configured for picking the unit load from the stack and transferring it to the transport system, an image capturing device with an image capturing unit, which is configured for capturing an image of a side of the stack, an evaluation unit, which is configured for evaluating, by image recognition, an image captured by the image capturing unit, wherein the image capturing unit is data-technically connected to the evaluation unit in order to transmit the captured image to the evaluation unit, a database that is data-technically connected to the evaluation unit, in which database unit load data are deposited for the respective unit loads, wherein the unit load data comprise an identification position for each unit load, which specifies, relative to at least one unit load edge of the respective unit load, where an identification mark assigned to the respective unit load is attached on the respective unit load, and a control device, which is configured for controlling the removal device such that the gripping unit is aligned relative to a unit load to be removed from the stack. The evaluation unit may be configured for carrying out the steps:

evaluating the captured image, wherein an identification mark is recognized by image recognition and an absolute position of the identification mark relative to a reference point is determined, identifying a unit load, which is assigned to the recognized identification mark, reading out unit load data of the identified unit load from the database and determining an edge position of the at least one unit load edge relative to the reference point by the evaluation unit, wherein the edge position is computed from the determined absolute position of the identification mark assigned to the identified unit load and from its identification position, transmitting the edge position of the at least one unit load edge of the identified unit load to the control device.

The transport system can comprise a conveying system, on which unit loads can be placed and by means of which unit loads can be transported and/or conveyed. The conveying system is preferably configured as a ground-based conveying system, for example as a roller conveying system or as a belt conveying system. Here, each of the conveying systems are stationary.

As an alternative or in addition to this, the (ground-based) conveying system can have a mobile conveying system, for example in sections, which comprises in particular autonomously displaceable conveying vehicles. Such conveying vehicles can be controlled by a superordinate master computer. Such conveying vehicles are known to the skilled person by the terms "automated guided vehicle" (AGV in short) or "autonomous mobile robot" (AMR in short).

Advantageously, the transfer station comprises a transport system for transporting the stack, which transport system is configured for transporting the stack to the image capturing device and/or to the transfer device and provision it there. The other transport system can be configured as described above for the transport system. Preferably, the other transport system is configured as a pallet conveying system.

Furthermore, it can be provided that the transfer station has a transport system for further transporting the stack, which is configured for transporting the stack from the image capturing device to the transfer device. Alternatively, it can be provided that the image capturing device and the transfer device are arranged at the same location, so that the stack can be provisioned simultaneously at the image capturing device and at the transfer device.

The automatic transfer device can comprise an industrial robot or a gantry robot, at which the gripping unit is arranged and by means of which the gripping unit can be moved.

Furthermore, it is favorable if the image capturing device has a means for aligning and/or fixing the stack. This means can be used to position and/or align the stack for capturing the image, so that the image can be captured reliably. Here, it can in particular be provided that the first side of the stack is aligned parallel to the image plane of the image capturing unit.

Furthermore, it is favorable if the transfer device has a means for aligning and/or fixing the stack in order to fix the stack for the removal of a unit load.

The means for aligning and/or fixing is preferably configured as a unit, in particular as an aligning and fixing means.

Advantageously, the means for aligning and/or fixing comprises multiple, in particular two or four, preferably angular, fixing elements, which are adjustable to the stack in order to align and/or fix same. To that end, the fixing elements are movable in particular in a first horizontal direction and in a second horizontal direction.

It is favorable if the image capturing unit is configured as a camera, in particular as a line scan camera. It can further be advantageous if the image capturing unit is mounted so as to be vertically displaceable along a vertical guide structure. Here, it can be favorable if a side of the stack to be captured is aligned and/or fixed parallel to the image capturing unit. Advantageously, a distance between the line scan camera and the stack can be maintained constant during a displacement movement of the line scan camera.

Advantageously, the evaluation unit comprises an evaluation computer with a memory. Preferably, an algorithm for image recognition is implemented on the evaluation computer. Further, the database can be deposited in the memory of the evaluation computer. Here, the database can be managed by the evaluation computer. Alternatively, the database is deposited in the memory of another computing unit and is managed by same.

It is further favorable if the image capturing device is configured for capturing an image of a second side of the stack. This ensures that also those unit loads can be identified whose identification marks are oriented towards the second side of the stack. Thus, also an increased reliability of the device is achieved.

Particularly preferably, it is provided that the image capturing device has a rotating unit, with which the stack can be rotated about a vertical axis of rotation, so that the stack can be brought in a first position, in which the first side of the stack faces the image capturing unit, and in a second position, in which the second side of the stack faces the image capturing unit.

Furthermore, it can be advantageous if the image capturing device has a first image capturing unit for capturing the first side of the stack and a second image capturing unit for capturing the second side of the stack, wherein preferably the first image capturing unit and the second image capturing unit enclose an angle of 90°. Particularly preferably, the first and second sides of the stack are each aligned parallel to the first and second image capturing units.

Making use of the effects and advantages described above, in another embodiment a storage system comprises a storage area for storing unit loads, a transfer station for removing a unit load from a stack of multiple unit loads arranged on top of one another, and a first transport system for transporting the stack to the transfer station for removal, wherein the transfer station is configured for removal according to any one of the aspects described above. To store unit loads, the storage area preferably comprises a rack arrangement with a storage and retrieval unit operated in an automated manner.

The storage system preferably comprises a goods receipt, at which stacks of unit loads are delivered. Further, the storage system can comprise a transport system, which is configured for transporting a stack from the goods receipt to the transfer station and provisioning the stack at the transfer device. This transport system can be provisioned, for example, by the other transport system of the transfer station, or adjoin same. The transport system can be configured as above for the transport system of the transfer station or for the other transport system of the transfer station.

Furthermore, while making use of the effects and advantages described above, another embodiment involves a computer-implemented method for generating a movement specification for a gripping unit of an automatic transfer device for removing a unit load from a stack of multiple unit loads arranged on top of one another, wherein the method comprises the following steps:

i) receiving an image of a first side of the stack captured by an image capturing unit, ii) evaluating the captured image by image recognition, wherein an identification mark recognizable in the captured image is recognized, which identification mark is arranged at a defined identification position at a unit load of the unit loads and assigned to the respective unit load, iii) identifying the unit load which is assigned to the recognized identification mark and reading unit load data of the identified unit load out from a database, in which the unit load data are provisioned, wherein the unit load data comprise the identification position of the identification mark and wherein the identification position is specified relative to at least one unit load edge of the respective unit load, iv) determining an absolute position of the identification mark relative to a reference point, v) determining an edge position of the at least one unit load edge of the identified unit load relative to the reference point from the absolute position and from the identification position of the recognized identification mark, vi) generating a movement specification for a control device for aligning the gripping unit of the automatic transfer device relative to the identified unit load.

It is also advantageous if steps ii) to v) are carried out for any and all identification marks that are recognizable in the captured image and for the unit loads assigned to same, wherein the method additionally comprises the step:

v') generating a digital image of the stack on the basis of the edge position of the at least one unit load edge of the respective unit loads determined in step v), wherein the movement specification is generated, in step vi), on the basis of the digital image of the stack.

It is expedient if step v') is carried out between steps v) and vi).

Advantageously, a movement specification for a specifiable number of unit loads of the stack, in particular for any and all unit loads of the stack, can be generated on the basis of the digital image.

BRIEF DESCRIPTION OF THE DRAWINGS

For the purpose of better understanding of the invention, it will be elucidated in more detail by the figures below.

The figures show in a respectively very simplified schematic representation.

DETAILED DESCRIPTION OF EXEMPLARY EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
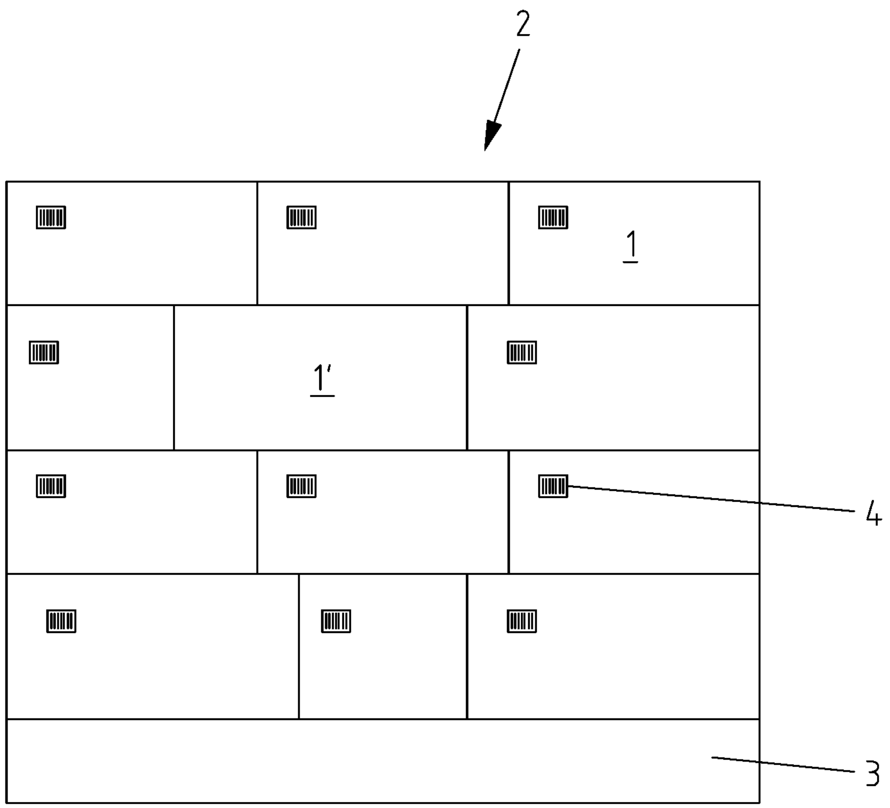
FIG. 1 a stack of multiple unit loads.

FIG. 1 shows a plurality of unit loads 1, which are arranged on top of one another and next to one another, so that they form a stack 2 of unit loads 1. Here, the unit loads 1 can be configured as containers. Alternatively, the unit loads 1 can also be configured as cardboard boxes or suchlike.

In the example represented, the stack 2 is arranged on a load carrier 3. Preferably, the load carrier 3 is configured as a pallet, on which the plurality of unit loads 1 are placed. Alternatively, the load carrier 3 can also be configured as a transport loading aid, roller cart, roller container, transport slide or suchlike. Transport loading aids are described, for example, in WO 2021/142498 A1. Also, it can be provided that the stack 2 is formed immediately on a floor, so that there is no load carrier 3.

The unit loads 1 of the stack 2 each have an identification mark 4, which is assigned to the respective unit load 1, so that the unit loads 1 are identifiable in an automated, unambiguous manner with the help of the identification mark 4. As is represented in FIG. 1 by way of example, it can happen that one or multiple of the unit loads 1' of the stack 2 have no identification mark 4 because it is lost or dirty, for example, and is therefore no longer recognizable. Such a unit load 1' can no longer be identified in an automated, unambiguous manner, which is why such a unit load 1' is referred to as a non-identifiable unit load 1'.

Figure 2:
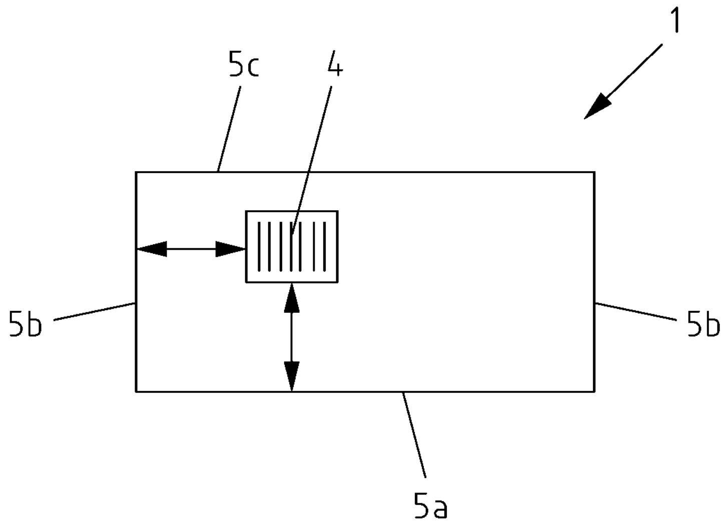
FIG. 2 a unit load with identification mark.

FIG. 2 shows a (identifiable) unit load 1. This unit load 1 has an identification mark 4, which is arranged at the unit load in a specific identification position. Here, the identification position is specified relative to at least one unit load edge Sa, 5*b*, 5*c*. The unit load edges Sa, 5*b*, 5*c* represented comprise a unit load bottom edge Sa, unit load side edges 5*b* and a unit load top edge 5*c*.

Preferably, the identification position of the identification mark 4 is specified as a normal distance between the at least one unit load side edge Sa, 5*b*, 5*c* and a center or a periphery of the identification mark 4, such as this is indicated in FIG. 2 by double arrows.

Figure 3A:
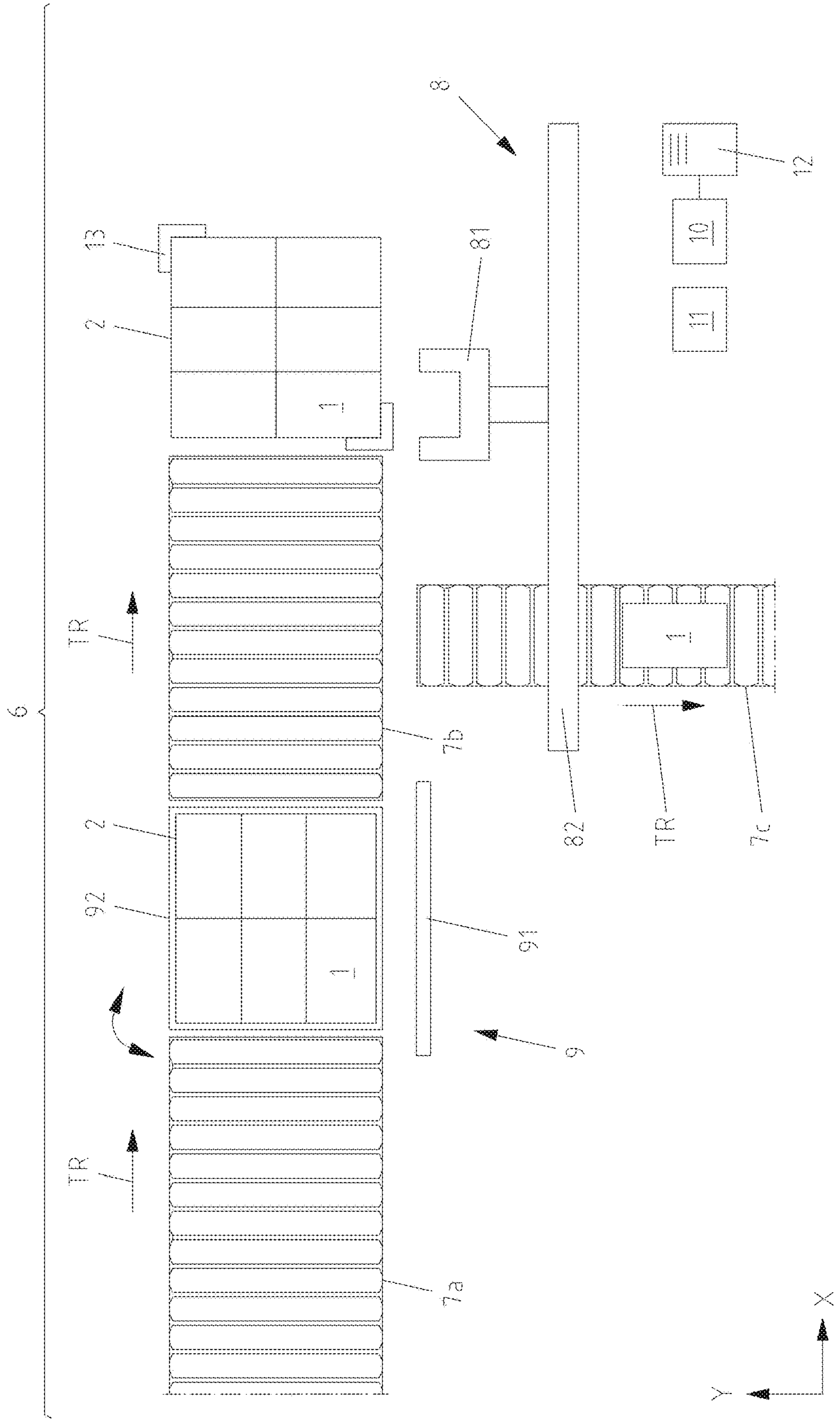
FIG. 3*a* a first embodiment of a transfer station for removing a unit load.
Figure 3B:
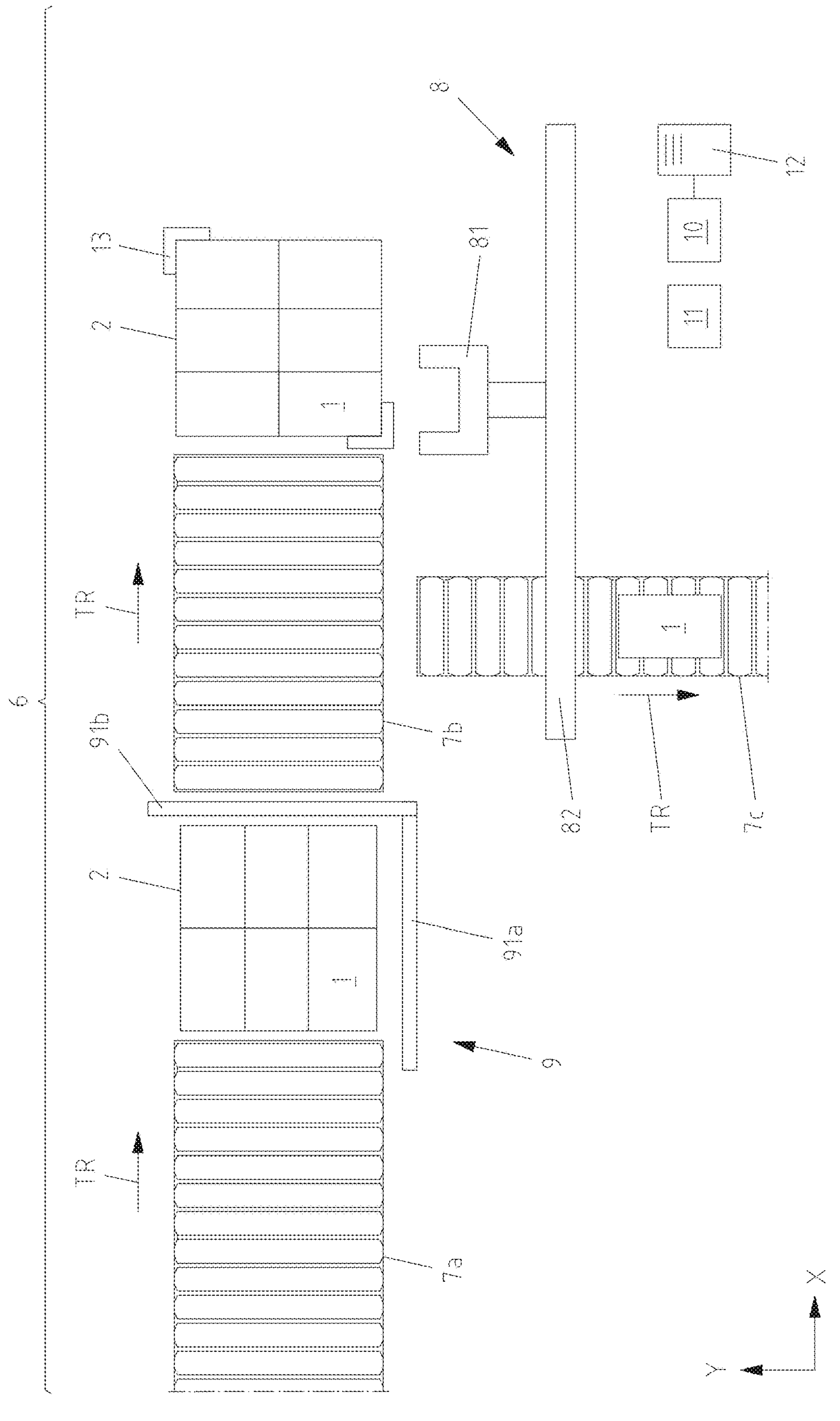
FIG. 3*b* a second embodiment of the transfer station for removing a unit load.

FIG. 3*a* and FIG. 3*b* show a first and second embodiment of a transfer station 6. The transfer station 6 comprises, respectively, a transport system 7*a* for transporting the stack 2, a transport system 7*b* for further transporting the stack 2 and a transport system 7*c* for transporting away the unit loads 1. Further, the transfer station 6 comprises an automatic transfer device 8, an image capturing device 9, an evaluation unit 10 and a control device 11. The image capturing device 9, the evaluation unit 10 and the control device 11 are interconnected in terms of data technology, such as this is not represented in the figures for reasons of better clarity.

The transport system 7*a* for transporting the stack is configured for transporting the stack 2 to the image capturing device 9 in a transport direction TR and provisioning it there. Furthermore, the transport system 7*b* for further transporting the stack 2 is configured for transporting the stack 2 from the image capturing device 9 to the transfer device 8 in the transport direction TR. Finally, the transport system 7*c* for transporting away the unit loads 1 is configured for transporting the unit loads 1 which were transferred to the transport system 7*c* by the transfer device 8 away from the transfer device 8 in the transport direction TR. The transport system 7*a*, 7*b*, 7*c* represented in FIG. 3*a* and FIG. 3*b* comprises, respectively, a stationary (ground-based) conveying system, which is represented as a roller conveying system by way of example. Evidently, a conveying system that is distinct from the roller conveying system, for example a belt conveying system, is also possible. As an alternative to the stationary conveying system, or in addition to it, the transport system 7*a*, 7*b*, 7*c* can also have a mobile conveying system, which comprises in particular autonomously displaceable conveying vehicles. The individual transport systems 7*a*, 7*b*, 7*c* can also be structured in a mutually distinct manner.

The transfer device 8 is configured for removing unit loads 1 from the stack 2. To that end, the transfer device 8 has a gripping unit 81. The gripping unit 81 is movable in three directions in space, in particular in a vertical direction, as well as in a first horizontal direction and a second horizontal direction, so that the gripping unit 81 can be aligned with the stack 2 and/or with a unit load 1 to be removed.

To that end, the transfer device 8 can comprise an industrial robot and/or a robot arm, at which the gripping unit 81 is arranged and by means of which the gripping unit 81 can be moved. The transfer device 8 can also comprise a gantry robot, such as this is represented in FIG. 3*a* and FIG. 3*b* by way of example. Here, the gripping unit 81 can be mounted on a frame 82 of the transfer device 8 so as to be vertically and horizontally displaceable.

Figure 4A:
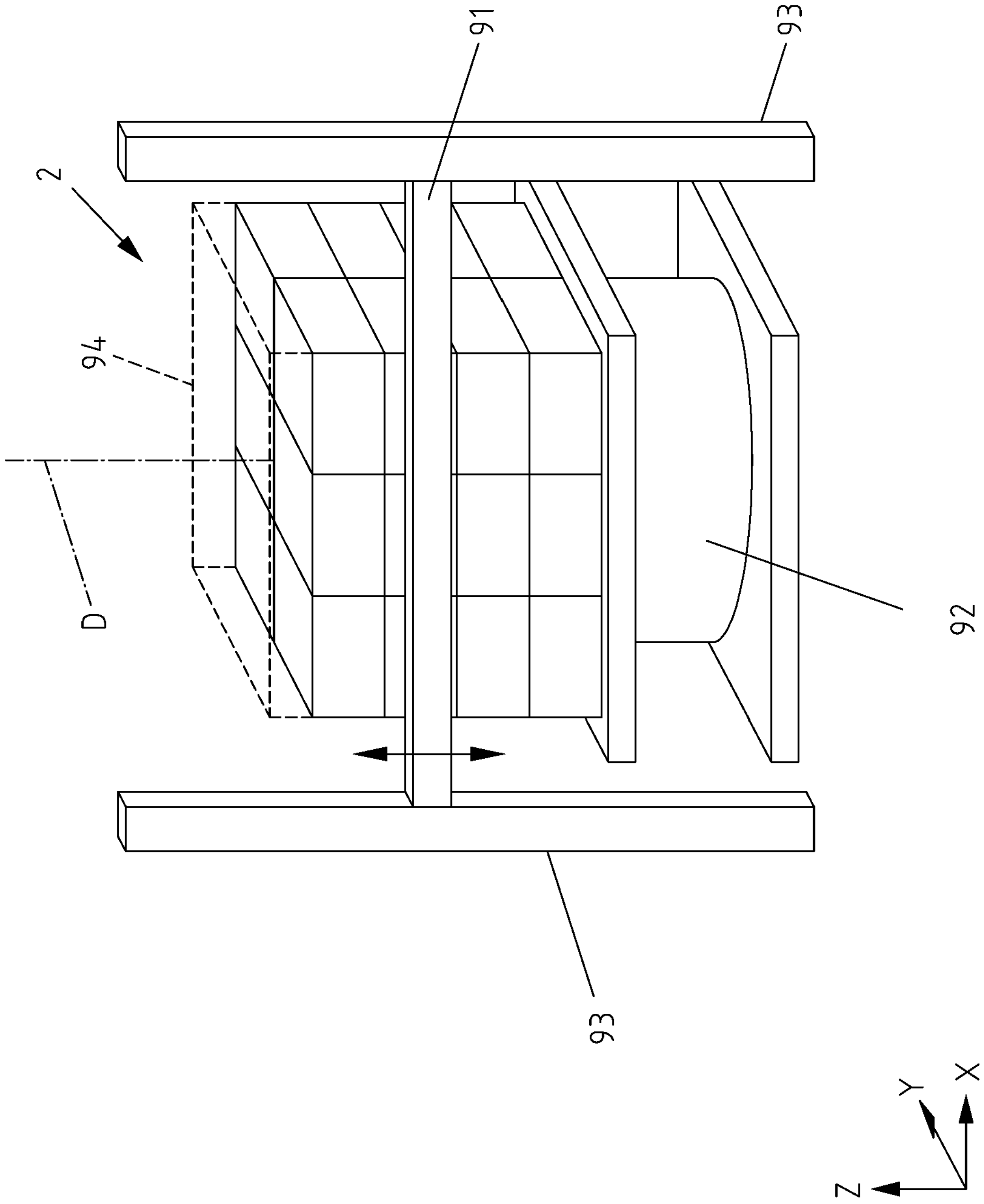
FIG. 4*a* a first embodiment of the image capturing device.

The transfer station 3*a* represented in FIG. 3*a* comprises a first embodiment of the image capturing device 9, which is represented in FIG. 4*a* in a perspective view. In the first embodiment, the image capturing device 9 comprises an image capturing unit 91, which is configured for capturing images of a first side of the stack 2. To that end, the stack 2 can be provisioned such at the image capturing device 9 that the first side of the stack 2 faces the image capturing unit 91.

Furthermore, the image capturing device 9 can be configured for capturing images of a second side of the stack 2. To that end, as shown in FIG. 3*a*, a rotating unit 92 can be provided, by means of which the stack 2 can be moved from the first position to a second position, in which the second side of the stack 2 faces the image capturing unit 91. A rotation of the stack 2 by the rotating unit 92 is indicated in FIG. 3*a* by a double arrow. Alternatively, the image capturing unit 91 can be mounted so as to be pivotable, so that it can be pivoted from a first position for capturing the first side of the stack 2 to a second position for capturing the second side of the stack 2.

Figure 4B:
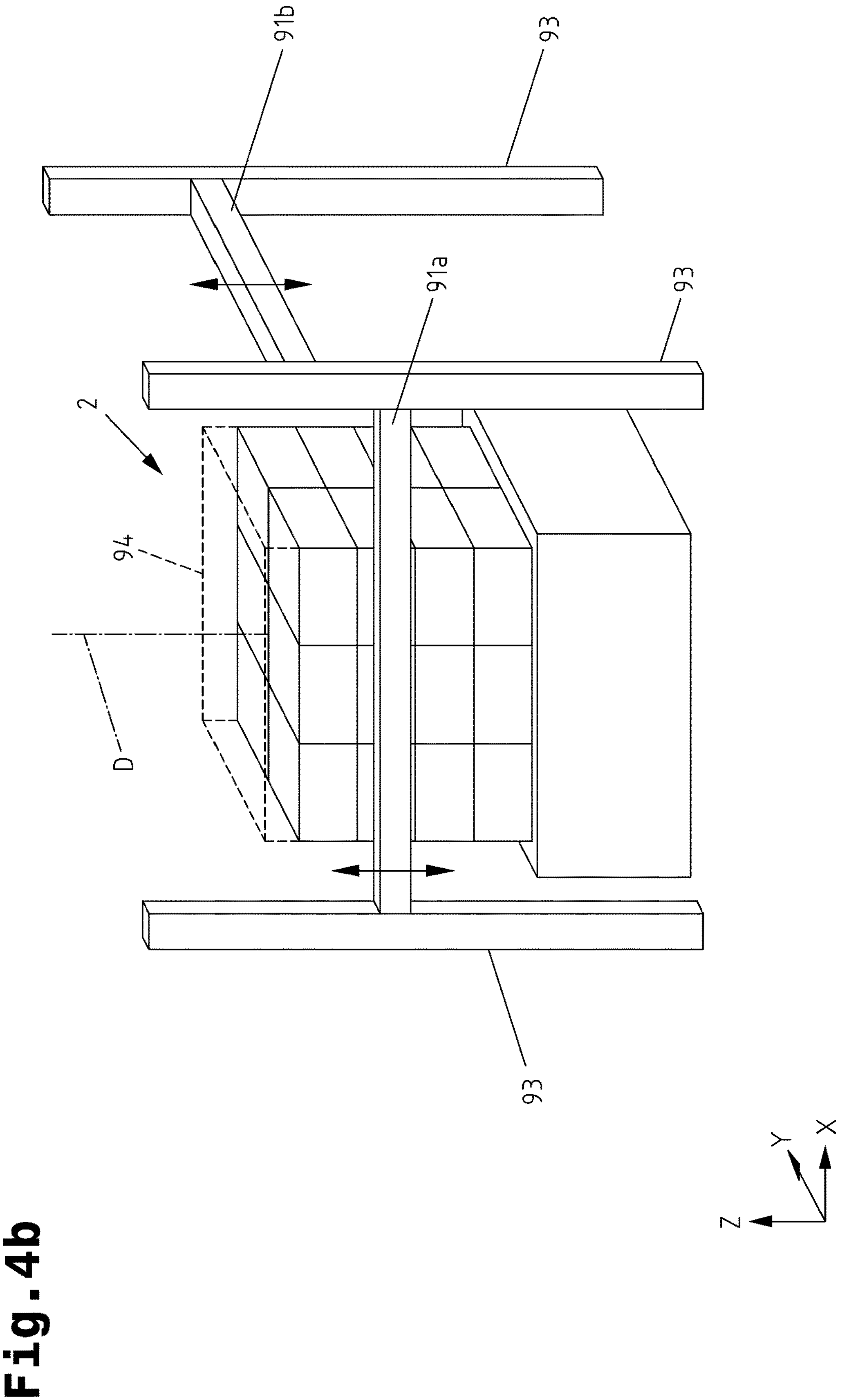
FIG. 4*b* a second embodiment of the image capturing device.

Alternatively, the transfer station 6 represented in FIG. 3*b* comprises a second embodiment of the image capturing device 9, which is represented in a perspective view in FIG. 4*b*. Here, the image capturing device 9 comprises a first image capturing unit 91*a* and a second image capturing unit 91*b*, which are arranged orthogonally to each other, so that the first image capturing unit 91*a* is configured for capturing the first side of the stack 2 and the second image capturing unit 91*b* is configured for capturing the second side of the stack 2. To that end, the stack 2 can be provisioned such at the image capturing device 9 that the first side of the stack 2 faces the first image capturing unit 91*a* and the second side of the stack 2 faces the second image capturing unit 91*b*.

The image capturing device 9 is data-technically connected to the evaluation unit 10 in order to transmit captured images to same. The evaluation unit 10 preferably comprises an evaluation computer, on which an algorithm for image recognition is implemented. In the example represented, the evaluation unit 10 is data-technically connected to a database 12. Alternatively and with the same effect, it can be provided that the evaluation unit 10 comprises the database 12.

In the database 12, a plurality of data can be deposited, in particular unit load data, which relate to the unit loads 1. The unit load data of a unit load 1 comprise at least the identification position of the identification mark 4 of the respective unit load 1, wherein the identification position is specified relative to at least one unit load edge Sa, 5*b*, 5*c*, as described above. The evaluation unit 10 is configured for reading out the unit load data.

Furthermore, the evaluation unit 10 is configured for identifying individual unit loads 1 on the basis of the image recognition and for determining their position in the stack 2, in particular their edge position.

Further, the evaluation unit 10 is connected to the control device 11 in order to transmit the edge position of the respective unit load 1 to same.

The control device 11 is configured for controlling the transfer device 8 such that it removes a unit load 1 from the stack 2. The transfer device 8 and the control device 11 are interconnected, in particular in terms of data technology, such as this is not represented in the figures for reasons of better clarity.

To align and/or fix the stack 2 in a removal position, the transfer station 6 comprises a means for aligning and/or fixing. In the example represented, the means for aligning and/or fixing comprises two angular fixing elements 13, which are adjustable to the stack 2 in order to align and/or fix same.

Figure 3C:
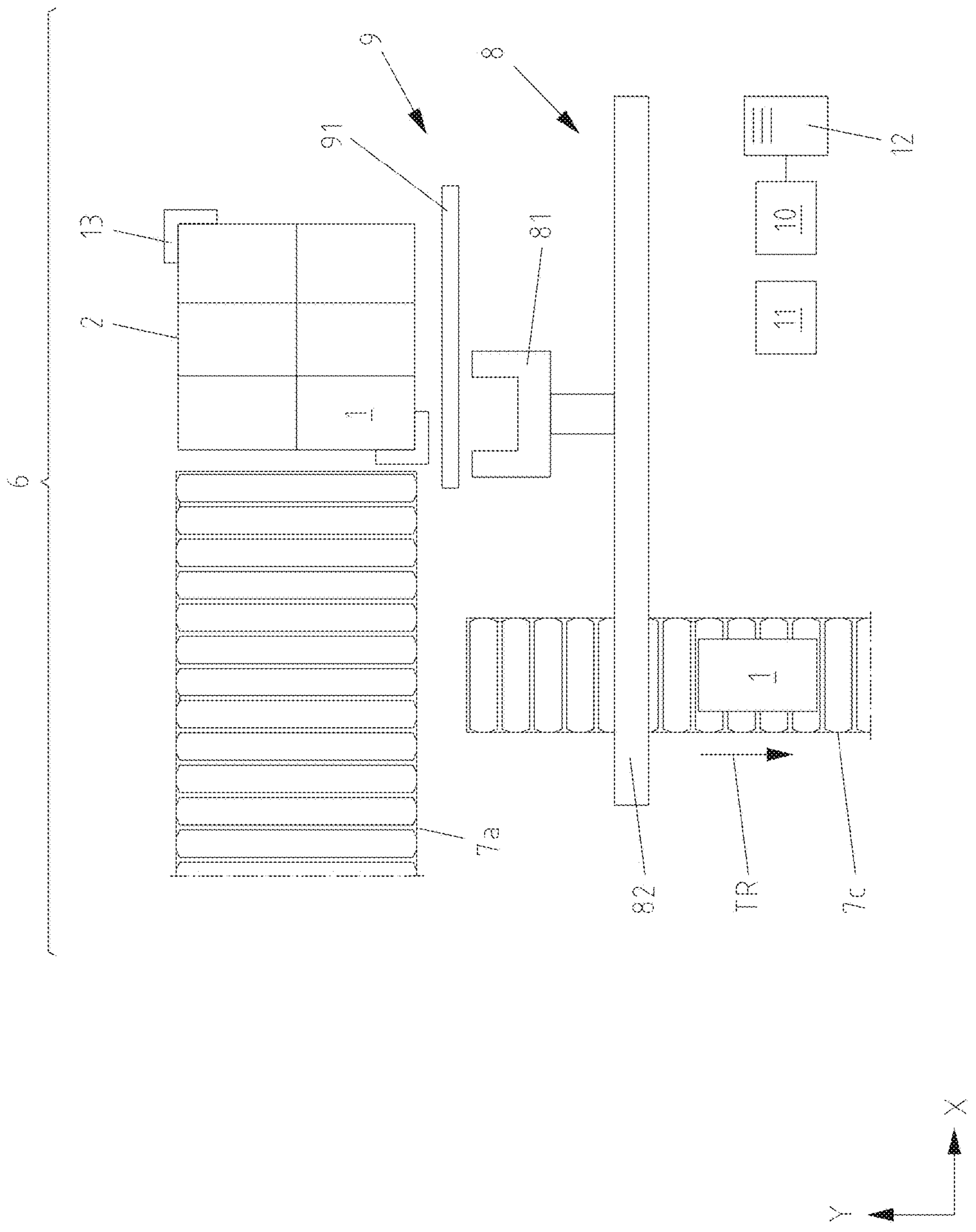
FIG. 3*c* a third embodiment of the transfer station for removing a unit load.

FIG. 3*c* shows another embodiment of the transfer station 6, which is configured essentially analogous to the transfer stations 6 shown in FIG. 3*a* and FIG. 3*b*. Here, however, the image capturing device 9 and the transfer device 8 are arranged essentially at the same location, so that the stack 2 can be provisioned simultaneously at the transfer device 8 and at the image capturing device 9. The capturing of the images can thus be done immediately at the transfer device 8.

FIG. 4*a* shows the first embodiment of the image capturing device 9 in a perspective view. Here, the image capturing device 9 comprises an image capturing unit 91, which is vertically displaceable along a vertical guide structure 93, as is indicated in FIG. 4*a* by a double arrow. The stack 2 arranged on the load carrier 3 is provisioned on the rotating unit 92. The rotating unit 92 is configured essentially as a rotating table and comprises a receiving platform for receiving the stack 2 that can be rotated about a vertical axis of rotation D. Thus, the stack 2 can be rotated about the axis of rotation D in a horizontal plane from the first position, in which the first side of the stack 2 is directed towards the image capturing unit 91, to the second position, in which the second side of the stack 2 is directed towards the image capturing unit 91. Evidently, it can also be provided that the stack 2 can be rotated to a third and fourth position, in which the third and/or fourth side of the stack 2 is directed towards the image capturing unit 91, so that all four sides of the stack 2 can optionally be captured.

FIG. 4*b* shows the second embodiment of the image capturing device 9 in a perspective view. Here, the image capturing device 9 has a first image capturing unit 91*a* and a second image capturing unit 91*b*, which are aligned in a mutually orthogonal manner. It is thus achieved that the stack can be provisioned such at the image capturing device 9 that the first side is directed towards the first image capturing unit 91*a* and the second side is directed towards the second image capturing unit 91*b*. Also here, the image capturing units 91*a*, 91*b* are each vertically displaceable along a vertical guide structure 93.

Furthermore, also the second embodiment of the image capturing device 9 can optionally have a rotating device 92 described above in order to capture, for example, also the third and fourth side of the stack.

To fix the stack 2 for the capturing of an image, the image capturing unit 91 comprises a means for fixing 94, which is represented respectively in dashed lines in FIG. 4*a* and FIG. 4*b*.

Figure 4C:
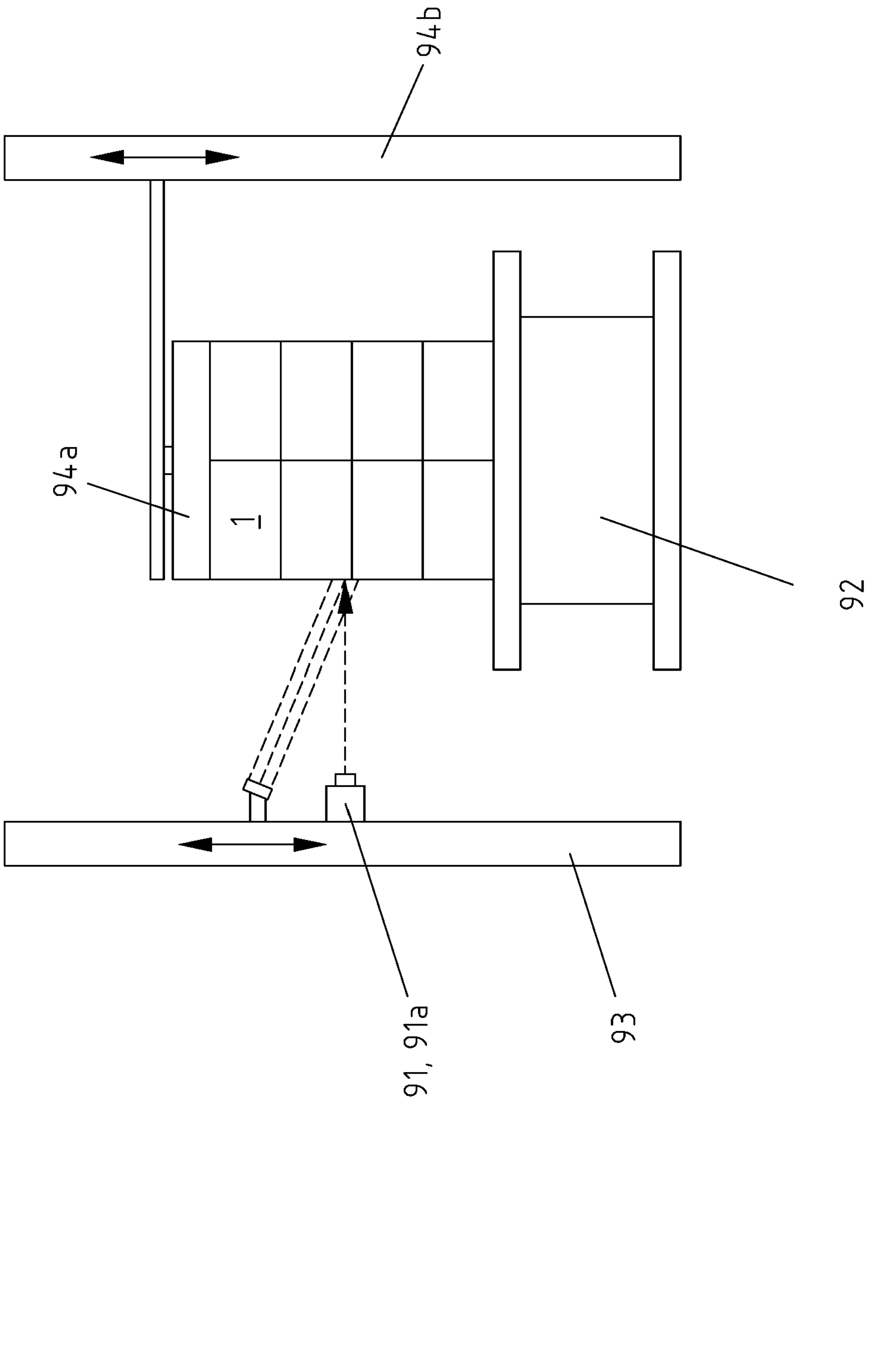
FIG. 4*c* the image capturing device according to FIG. 4*a* or FIG. 4*b* in a side view.

FIG. 4*c* shows the image capturing device 9 of the first and/or second embodiment in a side view. The image capturing unit 91, 91*a* is mounted on the vertical guide structure 93 so as to be displaceable. The capturing of the image is indicated by a dashed arrow. Above the image capturing unit 91, 91*a*, a lighting unit 95 for lighting a region captured by the image capturing unit 91, 91*a* is arranged, which is also mounted on the guide structure 93 so as to be vertically displaceable. The lighting is indicated by three parallel dashed lines.

As can also be seen in FIG. 4*c*, the image capturing device 9 comprises a means for fixing 94. The means for fixing 94 comprises a pressure holder 94*a*, which is mounted on another vertical guide structure 94*b* so as to be vertically displaceable. The pressure holder 94*a* can be used to exert a pressure on the stack 2 from above in order to fix same.

Figure 5:
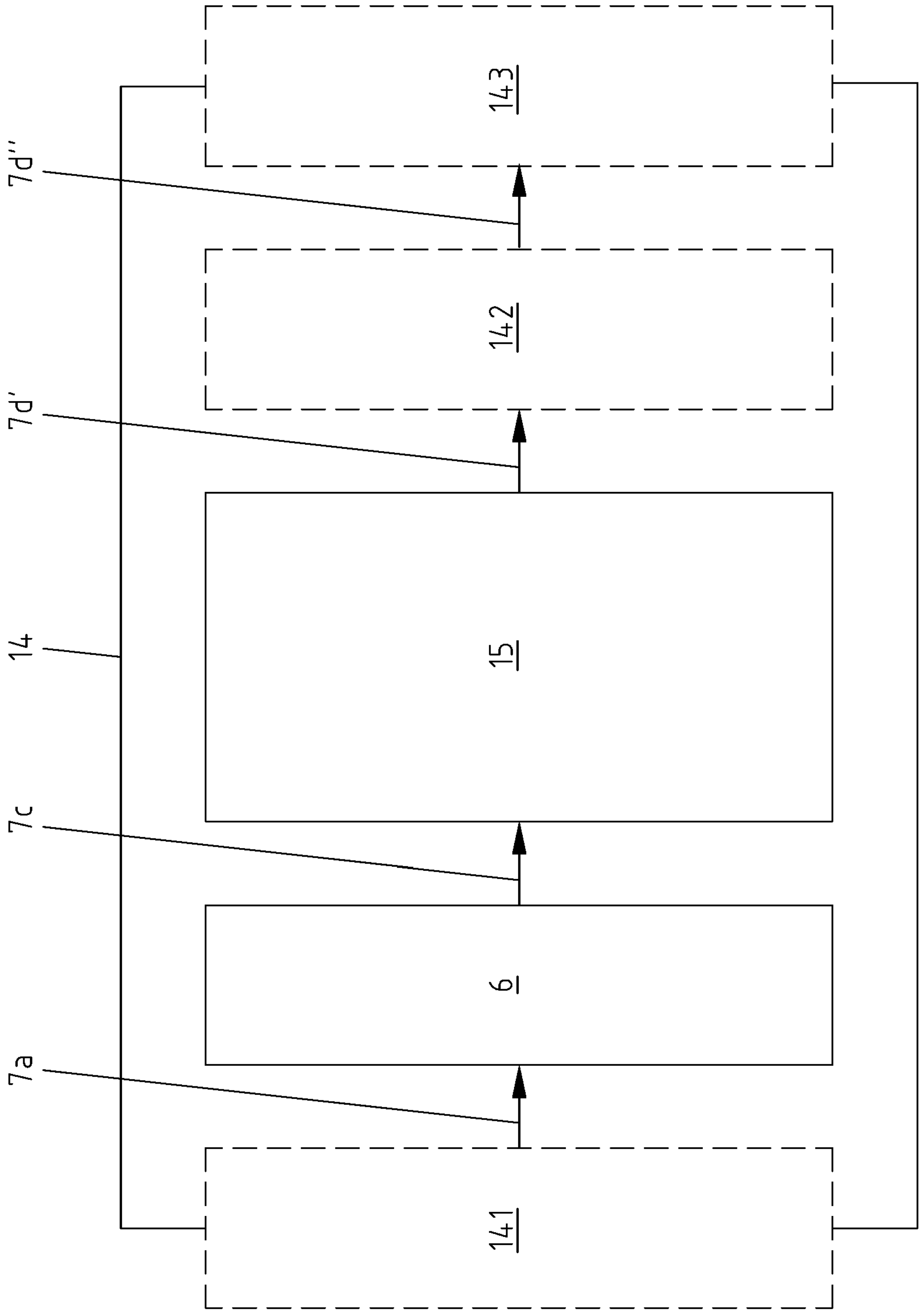
FIG. 5 a block diagram of a storage system with a transfer station.

FIG. 5 shows a schematic representation of a storage system 14 with a transfer station 6 and a storage area 15. Here, the transfer station 6 can be configured as described above. The storage area 15 is configured for storing unit loads 1. To that end, the storage area 15 preferably comprises a rack arrangement that is not represented with a storage and retrieval unit operated in an automated manner. Further, the transfer station 6 is connected to the storage area 15 via the transport system 7*c* for transporting away the unit loads 1.

Optionally, the storage system 14 can have a goods receipt 141, at which articles, in particular the stack 2 of unit loads 1, are delivered. The optional goods receipt 141 is represented in FIG. 5 by dashed lines. Here, the stacks 2 are usually arranged on load carriers 3, for example on pallets or suchlike. The goods receipt 141 is connected to the transfer station 6 via the transport system 7*a* for transporting the stack 2 to the transfer station.

Furthermore, the storage system 14 can optionally comprise a picking area 142, which is represented in FIG. 5 in dashed lines. In the picking region, articles are picked according to a customer order. To that end, the picking area 142 usually comprises a plurality of picking stations, to which unit loads 1 are transported by a transport system 7*d*' connecting the storage area 15 and the picking area 142. This transport system 7*d*' is configured for transporting unit loads 1, preferably in the same manner as the transport system 7*c* for transporting away the unit loads 1.

If a picking area 142 is provided, articles in accordance with the customer order can be removed from the unit loads 1 and placed in a target load carrier at the picking stations.

Further, the storage system 14 can comprise an optional goods issue 143, represented in FIG. 5 by dashed lines. Here, the goods issue 143 is also connected, in terms of conveyance, to the picking area 142 via a transport system 7*d*". The transport system 7*d*" can be configured for transporting the target load carriers, in particular in a manner analogous to the transport systems 7*c*, 7*d*' described above.

Figure 6B:
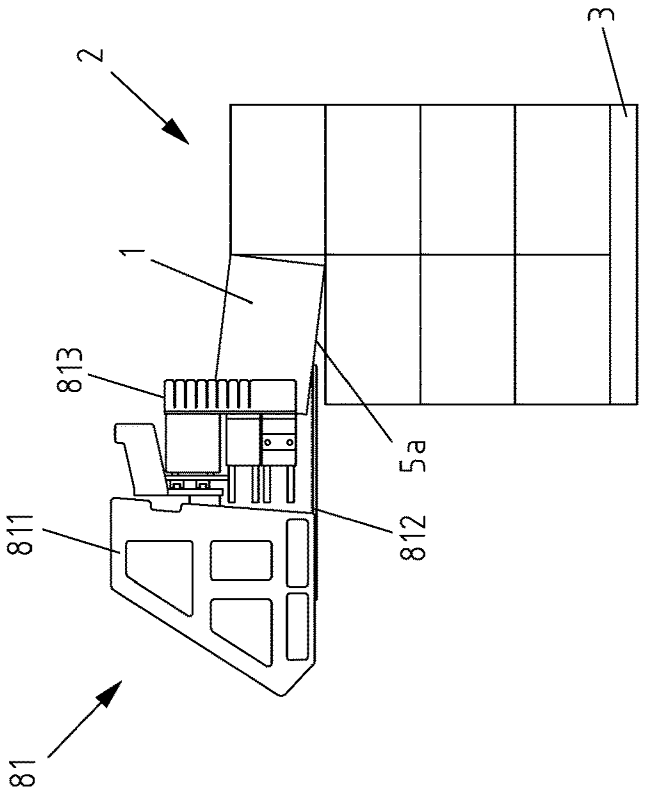
FIG. 6*a*, 6*b* a gripping unit of a transfer device during a removal operation, FIG. 7 the method steps of a method for removing unit loads from a stack.
Figure 6A:
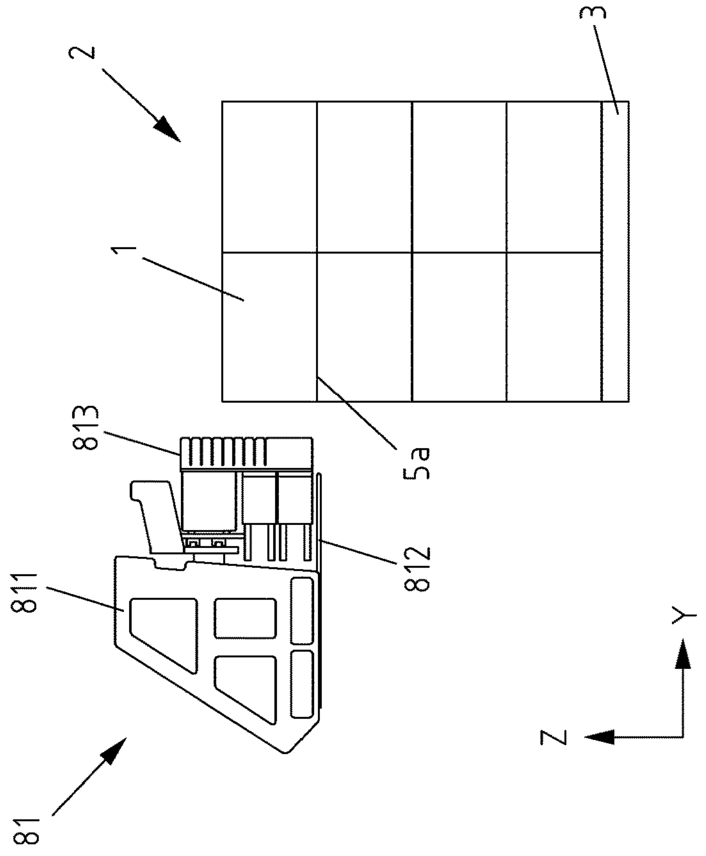

FIG. 6*a* and FIG. 6*b* show a gripping operation of the gripping unit 81 of the transfer device 6 during removal of a unit load 1 from the stack 2.

In the embodiment represented, the gripping unit 81 comprises a base frame 811 and at least one loading tongue 812 that is movable in a first direction (y) relative to the base frame 811 between a retracted initial position, as shown in FIG. 6*a*, and an extended receiving position, as shown in FIG. 6*b*.

Further, the gripping unit 81 represented by way of example has clamping jaws 813 for clamp-gripping the unit load 1 which are movable relative to each other in a second direction (x) between a retracted opening position and a clamping position that is adjusted (to a unit load 1). The clamping jaws 813 are furthermore displaceable relative to the base frame 811 in a third direction (z) between a bottom height position, as shown in FIG. 6*a*, and a top height position, as shown in FIG. 6*b*.

In FIG. 6*a*, the transfer device 6 is aligned relative to the stack 2 in that the control device 11 controls the gripping unit 81 such that the loading tongue 812 is essentially aligned with the unit load bottom edge 6*a*.

As represented in FIG. 6*b*, the clamping jaws 813 are positioned laterally next to the unit load 1 to be removed. Here, the clamping jaws 813 are in the retracted opening position. Subsequently, the clamping jaws 813 are moved to the adjusted clamping position in order to clamp and lift the unit load 1. As can be seen in FIG. 6*b*, the unit load 1 can be tilted from the bottom height position to the top height position by a movement of the clamping jaws 813. In a gap that forms under the tilted unit load 1, the loading tongue 811 can be inserted under the unit load 1 in order to support the unit load 1 from below. An example of a gripping operation is in particular described in detail in WO 2020/014725 A2.

The cause-effect relations of individual components explained in the context of the preceding figures are described in more detail in relation to a method for removing a unit load 1 from a stack 2.

Figure 7:
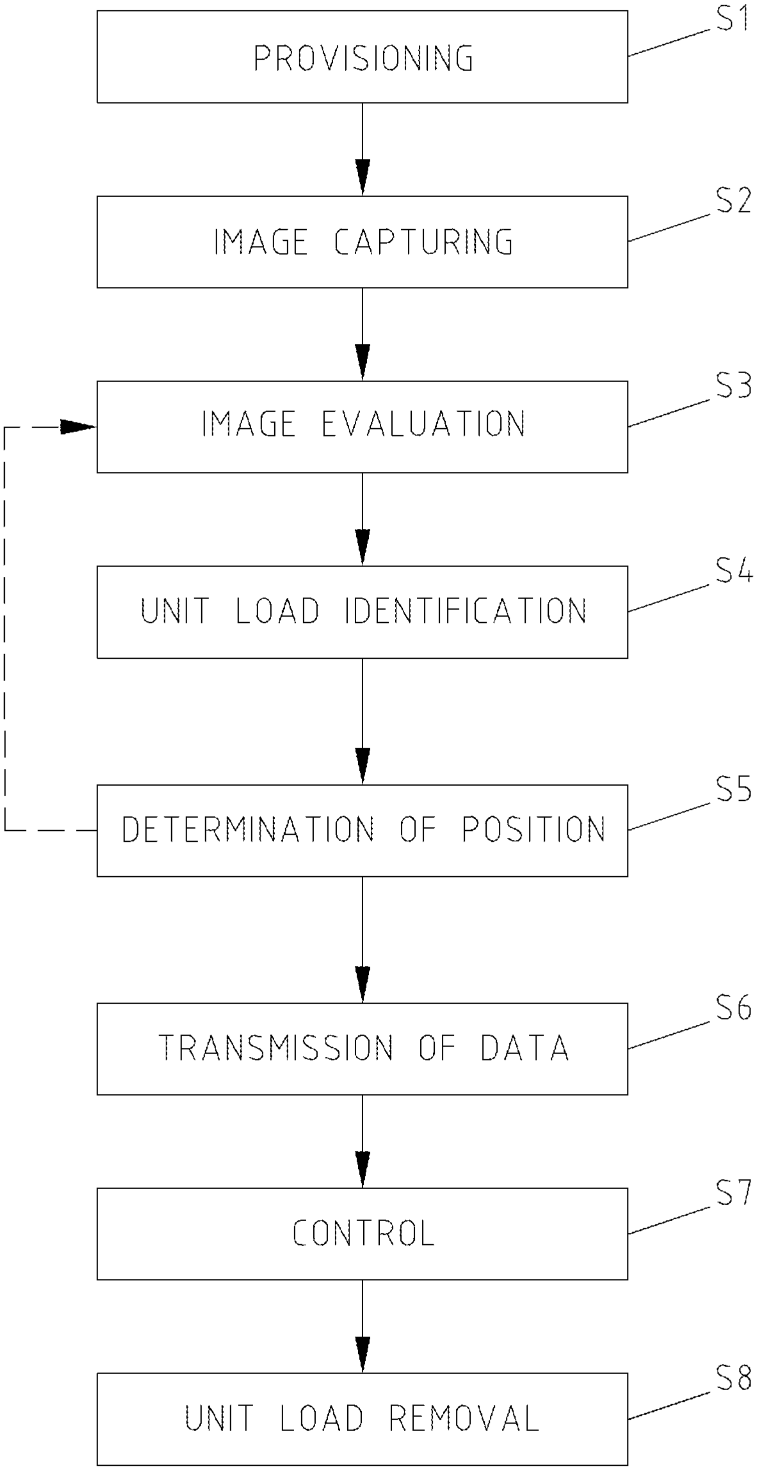

Such a method is schematically represented in FIG. 7. Here, a provisioning S1 of a stack 2 of unit loads 1 takes place at the transfer device 8 first. As described above, the stack can be transported to the transfer device 8 by a transport device 7' to that end. Further, the stack can be aligned and fixed by the fixing elements 13.

In a next step, an image capturing S2 takes place. Here, an image of a first side of the stack 2, and optionally an image of a second side of the stack 2, is captured by the image capturing unit 9. The captured image is transmitted to the evaluation unit 10 by the image capturing unit 9. To that end, the image capturing unit 9 and the evaluation unit 10 are interconnected in terms of data technology, as described above. In a preferred embodiment, not only an image of the first side of the stack 2 but additionally an image of a second side of the stack 2 is captured here.

Further, an image evaluation S3 of the captured image is done by the evaluation unit 10. Here, the captured image is evaluated in order to recognize the identification mark 4 of a unit load 1. Here, an absolute position of the identification mark 4 relative to a reference point is determined. The reference point can be, for example, a coordinate origin, with which the stack 2 and/or the load carrier 3 is aligned. The image evaluation S3 can be carried out for multiple unit loads 1, so that multiple identification marks 4 of multiple unit loads 1 are recognized and their respective absolute position is determined.

Subsequently, a unit load identification S4 takes place, wherein the unit load 1 is identified by the recognized identification mark 4. Here, unit load data of the identified unit load 1 are read out from the database 12, wherein the unit load data comprise the identification position. To that end, the evaluation unit 10 is data-technically connected to the database 12. Also the unit load identification S4 can be performed for multiple unit loads 1, in particular for all unit loads 1 whose identification marks 4 were recognized during the image evaluation S3.

In a next step, a determination of position S5 takes place, wherein an edge position of the unit load 1 is computed from the previously determined absolute position and the identification position of the unit load 1 read out from the database 12. This can be done for the unit load bottom edge Sa, the unit load side edges 5*b* and/or the unit load top edge 5*c*. The determination of position S5 can be done, for example, by an addition of vectors, wherein a first vector specifies the absolute position of the identification mark 4 relative to the coordinate origin and/or to the reference point and another vector specifies the identification position of the identification mark 4 relative to the unit load edge Sa, 5*b*, 5*c* to be computed. Also the determination of position S5 can for multiple unit loads 1, in particular for all unit loads 1 whose identification marks 4 were recognized during the image evaluation S3.

Here, it can also be provided that the identification position is specified relative to one of the unit load edges Sa, 5*b*, 5*c* and a dimension of the unit load 1, in particular a width, height and depth, is additionally deposited in the unit load data. Thus, also the edge positions of any and all unit load edges Sa, 5*b*, 5*c* can be computed.

If the stack 2 comprises a unit load 1' whose identification mark 4 was not recognized during the image evaluation S3 or which cannot be identified during the unit load identification S4, the edge position of the non-identifiable unit load 1' is determined from the edge position of the adjacent unit loads 1.

If the edge position is known, a transmission of data S6 takes place, wherein the edge position is transmitted from the evaluation unit 10 to the control device 11. This can be done for any and all edge positions and/or unit loads 1 that were determined. In particular, the edge position of the unit load bottom edges 5*a* of a unit load 1 to be removed is transmitted to the control device 11.

In another step, a control S7 of the transfer device 8 by the control device 11 takes place. Here, the transfer device 8 is controlled such that the gripping unit 81 of the transfer device 8 is aligned relative to the identified unit load 1 on the basis of the determined edge position. This can be done as described above in relation to FIG. 6*a* and FIG. 6*b*.

Finally, a unit load removal S8 takes place. Here, the identified unit load 1 is gripped by the gripping unit 81 and transferred to the transport system 7 by the transfer device 8, for example as described above in relation to FIG. 6*a* and FIG. 6*b*. The transport system 7 ensures that the unit load 1 is transported away from the transfer station 6 to the storage area 15, for example.

If the unit load 1 transferred to the transport system 7 is a non-identifiable unit load 1', this unit load 1' can be transported to an error handling workstation by the transport system 7. At the error handling workstation, the non-identifiable unit load 1 can be identified and the identification mark renewed, for example by a person.

As indicated by a dashed arrow, the steps of the evaluation S3 of the captured image, of the identification S4 of the unit load 1 and of the determination S5 of the edge position can be repeated for multiple unit loads 1. The thus determined edge positions can be used to generate a digital image of the stack 2, which is transmitted S6 to the control device 11. The control S7 can then be done on the basis of the digital image of the stack 2.

The method, in particular the unit load removal S8, can be repeated until such time as a defined number of unit loads 1, in particular all unit loads 1 of the stack 2, have been transferred to the transport system 7. Thus, a particularly efficient unstacking of a stack 2 can be achieved.

Finally, it should also be noted that the scope of protection is determined by the claims. However, the description and the drawings are to be adduced for construing the claims. Individual features or feature combinations from the different exemplary embodiments shown and described may represent independent inventive solutions.

In particular, it should also be noted that, in reality, the depicted devices can also comprise more, or also fewer, components than depicted. In some cases, the shown devices and/or their components may not be depicted to scale and/or be enlarged and/or reduced in size.

The invention claimed is:

1. A method for removing a unit load from a stack of multiple unit loads arranged on top of one another in a transfer station, wherein a unit load of the unit loads is removed from the stack by means of a gripping unit of an automatic transfer device and transferred to a transport system for transporting away the unit loads, wherein a plurality of the unit loads each have an identification mark assigned to the respective unit load, wherein each identification mark is arranged at a defined identification position at the respective unit load, and unit load data for each of the unit loads are deposited in a database, wherein the unit load data comprise at least the respective identification position, wherein the identification position is specified relative to at least one unit load edge of the respective unit load, the method comprising the steps of:

i) provisioning the stack in the transfer station, ii) capturing an image of a first side of the stack by an image capturing device and transmitting the captured image to an evaluation unit, iii) evaluating the captured image by the evaluation unit, wherein an identification mark of the identification marks is recognized by means of image recognition and an absolute position of the identification mark relative to a reference point is determined, iv) identifying a unit load, which is assigned to the recognized identification mark, reading unit load data of the identified unit load out from the database, v) determining an edge position of the at least one unit load edge relative to the reference point by the evaluation unit, wherein the edge position is computed from the determined absolute position of the identification mark assigned to the identified unit load and from its identification position, vi) transmitting the edge position of the at least one unit load edge of the identified unit load to a control device for controlling the automatic transfer device, vii) controlling the automatic transfer device by the control device, so that the gripping unit of the automatic transfer device is aligned relative to the identified unit load on the basis of the determined edge position, viii) removing the identified unit load from the stack and transferring the identified unit load to the transport system by the automatic transfer device.

2. The method according to claim 1, wherein the identification marks of the unit loads are arranged at a first side wall and/or at a second side wall of the respective unit load, and wherein in step ii), an image of a second side of the stack is additionally captured by the image capturing device and transmitted to the evaluation unit, and step iii) is carried out for the captured image of the first side of the stack and/or for the captured image of the second side of the stack.

3. The method according to claim 1, wherein the steps iii) to v) are repeated for at least one other identification mark of the identification marks.

4. The method according to claim 1, wherein the stack comprises a non-identifiable unit load, and wherein the edge position of the at least one unit load edge of the non-identifiable unit load is determined from the edge position of the at least one unit load edge of one or multiple adjacent unit loads.

5. The method according to claim 4, wherein the steps vi) to viii) are carried out for the non-identifiable unit load and the at least one non-identifiable unit load is transported to an error handling workstation by the transport system.

6. The method according to claim 1, wherein the steps iii) to v) are repeated for all recognizable identification marks, and wherein, in step v), a digital image of the stack is generated on the basis of the determined edge positions of the respective unit loads.

7. The method according to claim 6, wherein the transmitting of the edge position of the unit load edges of the identified unit loads is done in step vi) by transmitting the digital image of the stack to the control device.

8. The method according to claim 1, wherein the steps vi) to viii) are repeated for at least one other unit load of the plurality of unit loads.

9. A transfer station for removing a unit load from a stack of multiple unit loads arranged on top of one another, comprising a transport system for transporting away unit loads, an automatic transfer device having a gripping unit for gripping unit loads and configured for picking the unit load from the stack and transferring the unit load to the transport system, an image capturing device with an image capturing unit configured for capturing an image of a side of the stack, an evaluation unit configured for evaluating, by image recognition, an image captured by the image capturing unit, wherein the image capturing unit is data-technically connected to the evaluation unit in order to transmit the captured image to the evaluation unit, a database data-technically connected to the evaluation unit, in which database unit load data are deposited for each of the unit loads, wherein the unit load data respectively comprise an identification position specifying relative to at least one unit load edge of a respective unit load where on the respective unit load an identification mark assigned to the respective unit load is attached, and a control device configured for controlling the transfer device such that the gripping unit is aligned relative to a unit load to be removed from the stack, wherein the evaluation unit is further configured for carrying out the steps of:

evaluating the captured image, wherein an identification mark is recognized by means of image recognition and an absolute position of the identification mark relative to a reference point is determined, identifying a unit load assigned to the recognized identification mark, reading unit load data of the identified unit load out from the database and determining an edge position of the at least one unit load edge relative to the reference point by the evaluation unit, wherein the edge position is computed from the determined absolute position of the identification mark assigned to the identified unit load and from its identification position, transmitting the edge position of the at least one unit load edge of the identified unit load to the control device.

10. The transfer station according to claim 9, wherein the image capturing device is configured for capturing an image of a second side of the stack.

11. The transfer station according to claim 10, wherein the image capturing device has a rotating unit, with which the stack can be rotated about a vertical axis of rotation, so that the stack can be brought in a first position, in which the first side of the stack faces the image capturing unit, and in a second position, in which the second side of the stack faces the image capturing unit.

12. The transfer station according to claim 10, wherein the image capturing device has a first image capturing unit configured for capturing the first side of the stack and a second image capturing unit configured for capturing the second side of the stack.

13. A storage system comprising a storage area for storing unit loads, a transfer station for removing a unit load from a stack of multiple unit loads arranged on top of one another, and a first transport system for transporting the stack to the transfer station, wherein the transfer station is configured according to claim 9.

14. The transfer station according to claim 12, wherein the first image capturing unit and the second image capturing unit enclose an angle of 90°.

15. A computer-implemented method for generating a movement specification for a gripping unit of an automatic transfer device for removing a unit load from a stack of multiple unit loads arranged on top of one another, the method comprising the steps of:

i) receiving an image of a first side of the stack captured by an image capturing unit, ii) evaluating the captured image by image recognition, wherein an identification mark recognizable in the captured image is recognized, wherein the identification mark is arranged at a defined identification position at a unit load of the unit loads and assigned to the respective unit load, iii) identifying the unit load which is assigned to the recognized identification mark and reading unit load data of the identified unit load out from a database, in which the unit load data are provisioned, wherein the unit load data comprise the identification position of the identification mark and wherein the identification position is specified relative to at least one unit load edge of the respective unit load, iv) determining an absolute position of the identification mark relative to a reference point, v) determining an edge position of the at least one unit load edge of the identified unit load relative to the reference point from the absolute position and from the identification position of the recognized identification mark, vi) generating a movement specification for a control device for aligning the gripping unit of the automatic transfer device relative to the identified unit load.

16. The method according to claim 15, wherein the steps ii) to v) are carried out for all identification marks that are recognizable in the captured image and for the unit loads assigned to the recognizable identification marks, and wherein the method additionally comprises the step of:

v') generating a digital image of the stack on the basis of the edge position of the at least one unit load edge of the respective unit loads determined in step v), wherein the movement specification is generated, in step vi), on the basis of the digital image of the stack.

* * * * *